Figure 1:
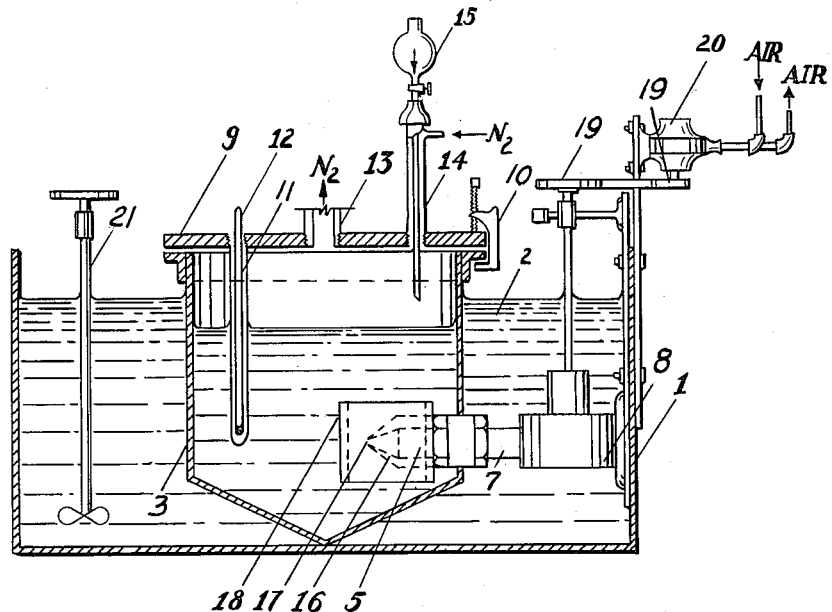

Dec. 18, 1951

V. L. HANSLEY ET AL 2,579,257

ALKALI METAL DISPERSIONS

Filed March 17, 1949

VIRGIL L. HANSLEY
WILLARD JOHN P. HILTS
INVENTORS.

BY *Amos G. Cole*

AGENT.

Patented Dec. 18, 1951

2,579,257

UNITED STATES PATENT OFFICE 2,579,257

ALKALI METAL DISPERSIONS

Virgil L. Hansley, Niagara Falls, and Willard John P. Hilts, Buffalo, N. Y., assignors to E. I. du Pont de Nemours & Company, Wilmington, Del., a corporation of Delaware Application March 17, 1949, Serial No. 81,874

22 Claims. (Cl. 252—309)

This invention relates to alkali metal dispersions in inert liquids and to their preparation.

Dispersions of alkali metals in inert organic liquids, prepared by suitably agitating a mixture of the metal and the liquid at a temperature above the melting point of the metal, have long been known and used. Such dispersions are relatively coarse and the metal particles thereof tend to settle out rapidly and to reagglomerate. The preparation of dispersions in which particle settling and reagglomeration are greatly reduced or eliminated is described in Hansley U. S. Patent 2,394,608, the method involving effecting the dispersions in the presence of an alkali metal soap. The particle size of the dispersed metal in products obtained by the method of the patent averages about 100 microns. Dispersions of much smaller particle size are desirable and valuable for many purposes because of their greater reactivity and the present invention is concerned with the preparation of such dispersions.

It is accordingly an object of the invention to provide new and improved dispersions of alkali metals in inert organic liquids, particularly hydrocarbon liquids, and to provide a convenient and practical method for making such dispersions. Another object is a method of preparing alkali metal dispersions which are stable against agglomeration and settling, are relatively fluid and in which the average particle size of the dispersed metal does not exceed about 50 microns and preferably is less than 25 microns. A still further object is the provision of diesel fuels of improved ignition characteristics due to the presence therein of small amounts of alkali metal finely dispersed in the hydrocarbon fuel in accordance with the invention. Still other objects will be apparent from the following description.

The above objects are accomplished in accordance with the invention in general by preparing an emulsion of finely divided molten particles of an alkali metal in an inert organic liquid having a boiling point above the melting point of the metal in the presence of an emulsifying agent of the type hereinafter defined. Such dispersions may be prepared by heating together an alkali metal and the inert liquid to a temperature between the melting point of the metal and the boiling point of the liquid in the presence of the emulsifying agent while effectively agitating the mixture and then cooling the resulting emulsion. The emulsifying agent may be present during the entire operation or may be added during the latter part of the period of agitation. Agitation may be accomplished by any desired method which will effect the proper degree of subdivision.

Dispersions prepared as above indicated contain the metal in a stable, finely divided, highly active form and, therefore, are useful for many purposes. Thus, they are useful as the source of alkali metal in carrying out chemical reactions, e. g., metallization and reduction reactions, and in petroleum refining processes. For some purposes dispersions containing low concentrations are desirable and such dispersions may generally be prepared by diluting a more concentrated product with any suitable inert organic liquid such as a petroleum hydrocarbon. The unusually finely divided form of the metal in the present products makes them useful as additives for diesel fuels of inferior ignition characteristics, the effect of the finely divided metal in such fuels being to increase the cetane number of the fuel.

A suitable and convenient form of apparatus for preparing the dispersions comprises an emulsifying vessel and a circulatory system by means of which a stream of a mixture of the molten metal and the inert liquid may be forced at high velocity through an orifice of suitable size. Preferably the stream from the orifice is directed at an abrupt angle, e. g., 90°, against a splash plate about ¼ in. away and immersed in the mixture, means being provided for adding the emulsifying agent to the system when required. Delivery of the mixture against the splash plate from a nozzle about $\frac{1}{16}$ to $\frac{1}{32}$ in. in diameter at a linear velocity of about 246 ft./sec. gives generally satisfactory results when operating on the scale indicated in the examples. Linear velocities should generally be at least about 100 ft./sec., 100 to 1,000 ft./sec. being generally satisfactory. The orifice size and the distance from the orifice to the splash plate may be varied considerably depending upon the scale of operation.

Figure 2:
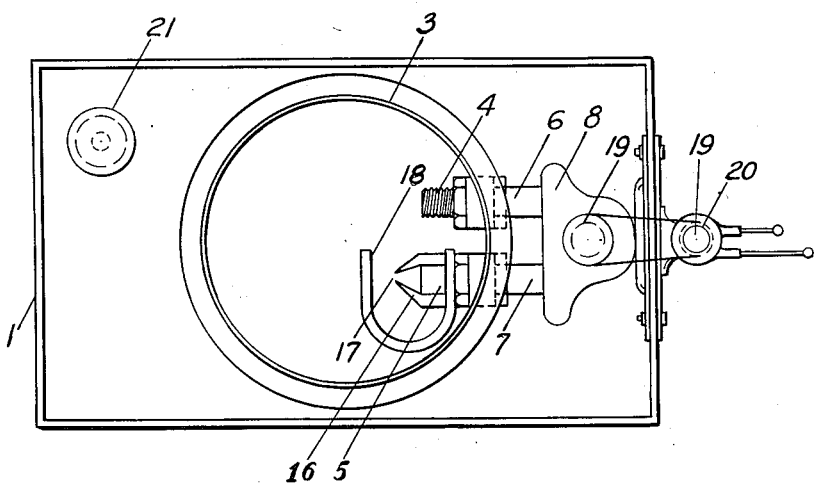

Apparatus such as that referred to above is illustrated diagrammatically in the accompanying drawing, of which Fig. 1 is a side view shown mostly in section and Fig. 2 is a top plan view shown with the cover removed.

In the drawing, I is a vessel containing an oil bath 2, in which is positioned emulsifying vessel 3. Into the bottom portion of the latter pass conduits 4 and 5 which are, respectively, extensions of inlet and outlet ports 6 and 7 of pump 8. Vessel 3 is provided with a cover 9, held in place by three clamps 10, only one of which is shown. The cover is provided with a well 11 for thermometer 12; a central port 13 for connection with a condenser (not shown) and for use as a nitrogen exit; and, with conduit 14 bearing dropping funnel 15 and having a side arm as shown for admitting a stream of nitrogen. The inner end of conduit 5 is provided with nozzle 16 having orifice 17 at its forward end. Opposite orifice 17 is splash plate 18 which is supported by conduit 5. Pump 8, drive pulleys 19 and air motor 20 for powering pump 8 are bolted in position on a side wall of vessel 1 as shown. Stirrer 21 is for agitating oil bath 2. Means for driving the stirrer and for heating and maintaining oil bath 2 at a suitable temperature are not shown and any conventional means for accomplishing such purposes may be used. It is generally desirable to insulate the side walls and bottom of vessel 1 to conserve heat and to aid in maintaining the temperature in oil bath 2 at the desired level.

In operation of the apparatus, the inert organic liquid and metal are charged into vessel 3 and when the charge has been suitably heated, pump 8 is started. The pump forces a stream of the charge through orifice 17, against splash plate 18. The emulsifying agent or compounds which react to form the agent in situ may be added when desired by way of dropping funnel 15. A slow stream of nitrogen is passed through the apparatus during practically the entire operation. The resulting emulsion may be cooled in vessel 3 and then removed, e. g., by siphoning, to another vessel for storage or use; or the emulsion may be cooled after its removal from vessel 3.

The term "alkali metals" is used herein to include lithium, sodium, potassium, rubidium and caesium and also alloys of two or more such metals with each other, for example, potassium-sodium alloys.

The terms "emulsion" and "emulsifying agent" are used herein with reference to the systems when they are at temperatures above the melting point of the metal, i. e., under conditions where the metal is liquid. The terms "dispersion" and "dispersing agent" are employed with reference to the same systems when they are at a temperature below the melting point of the metal.

The compounds which are suitable for use as emulsifying agents for the present purpose are complex addition compounds formed between two distinct types of alkali metal compounds. These two types of component compounds, i. e., the two types of alkali metal compounds which add together to form the complex addition compounds, are: (1) alkali metal alkoxides of the general formula MO—R wherein M is an alkali metal and R is an aliphatic, cycloaliphatic or aromatic radical; and (2) alkali metal organic compounds in which an alkali metal atom is directly attached to an allylic residue, i. e., compounds having at least one residue of the structure

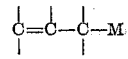

wherein M represents an alkali metal, or compounds which rearrange under the conditions of use to give such a residue. Compounds of either type alone are in general ineffective or substantially less effective than their addition compounds in which the ratio of total carbon atoms to total alkali metal atoms is 2–8:1 and preferably 2–7:1.

With reference to the component compounds of type (1) above, the identity of the portion of the molecule aside from the MO— group is unimportant except that elements other than carbon, hydrogen, oxygen and alkali metal should not be present. Furthermore, any oxygen atom other than that in the MO— group should be bonded only by carbon atoms as in an ether linkage, or be present in another MO— group. Alkoxides containing a single MO— group are preferred.

As to the structure of the component compounds of type (2), the important part thereof is the

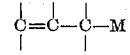

residue. It is unimportant what elements or radicals are attached to the unsatisfied bonds of the residue, so long as the compound contains only carbon, hydrogen, oxygen, and alkali metal atoms. Oxygen is not essential, but if present such atoms should be present only as part of ether or alkoxide structures, i. e., as part of C—O—C or C—OM residues. The

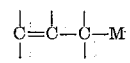

residue may be: entirely within a ring structure, as in sodium phenyl; entirely within an acyclic structure, as in sodium allyl; or, partly within both types of structures, as in sodium benzyl.

It is obvious from the above that there are some compounds which may be classified both as type (1) and type (2) compounds. Illustrative of such dual-type compounds is the compound of the formula

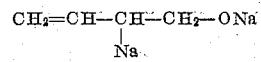

which may be formed by the cleavage of the ether ring in butadiene monoxide by means of sodium. With such dual-type compounds, the active complex addition compound is formed between molecules of the same compound.

The permissible number of carbon atoms in a compound of either type (1) or (2) will depend upon the number of alkali metal atoms present in that compound and also upon the number of carbon and alkali metal atoms present in the compound of the opposite type with which it is to be combined to form the addition compound. This is because the ratio of carbon atoms to alkali metal atoms in the addition compound must be within the range 2–8:1 for the addition compound to be effective. At higher carbon to metal ratios, the addition compound is relatively ineffective.

The effective complex addition compound may be added to the emulsification system in preformed condition; it may be formed in the system by the addition thereto of its preformed component compounds, which react with each other in the system to form the addition compound in situ; or, a compound or compounds may be added to the system which will react with the alkali metal under the conditions of use to form the intermediate component compounds which then immediately react to form the active addition compound. Formation of the addition compound in situ by the latter method is most practical and is preferred.

Illustrative of the use of preformed addition compounds, sodium methylate and sodium phenyl may be separately prepared, then reacted together in an inert liquid hydrocarbon to form the addition compound and the reaction mixture then added to the emulsification system. The sodium methylate may be prepared from methanol and sodium by well-known methods. The sodium phenyl may be prepared from sodium and monochlorobenzene by the method of Bockmühl and Ehrhart, U. S. Patent 2,012,372. If desired the methylate and the sodium phenyl may be added separately to the emulsification system.

One way of preparing the effective addition compound and also its component compounds in situ is to add to the emulsification system suitable quantities of other compounds which react with the alkali metal under the conditions of use to form initially the intermediate component compounds which then form the addition compound. Thus, methanol and monochlorobenzene may be added, the final result being the formation of the addition compound of sodium methylate with sodium phenyl. A preferred way is to add a single compound which reacts to produce both component compounds which then form the addition compound. Such a compound is phenyl methyl ether which is cleaved by the sodium to form sodium methylate and sodium phenyl. Either of these cleavage products alone is substantially less effective as an emulsifying agent than the addition product of the two, which is very effective.

It has been discovered that a number of ethers may be used in the above manner. The ethers which are suitable for such use are all cleaved by reaction with the alkali metal under the conditions of use. However, of the ethers which are cleavable, only those which yield cleavage products which are component compounds of types (1) and (2) as defined above are suitable. In order that the limitation on the ratio of carbon to metal atoms in the addition compound may be met, it is necessary that the ratio of total carbon atoms to the total number of cleavable ether linkages in such ethers be 4–16:1, and preferably 4–14:1.

Formation of the requisite component compounds from ethers of the above type is illustrated by the following equation:

$$CH_2=CHCH_2-O-CH_2CH=CH_2 + 2Na \longrightarrow$$
Allyl ether
$$CH_2=CHCH_2Na + CH_2=CHCH_2ONa$$
Sodium allyl  Sodium allylate Thus, the ether must contain at least one

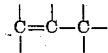

residue directly attached to an ether oxygen, or a residue rearrangeable thereto, in order to yield a cleavage product of type (2) above.

Illustrative of the ethers which are suitable for use are the following: the alpha or beta naphthyl alkyl or cycloalkyl ethers in which the alkyl or cycloalkyl radical contains from 1 to 6 carbon atoms, e. g., alpha or beta naphthyl methyl, ethyl, propyl or cyclohexyl ether; the phenyl alkyl or cycloalkyl ethers in which the alkyl or cycloalkyl group contains from 1 to 10 carbon atoms, e. g., phenyl methyl, ethyl, propyl, hexyl, or cyclohexyl ether; diphenyl ether; benzyl alkyl or cycloalkyl ethers in which the alkyl or cycloalkyl radical contains from 1 to 9 carbon atoms, e. g., benzyl methyl, ethyl, propyl, butyl, cyclohexyl or octyl ether; dibenzyl ether; the conjugated diene hydrocarbon monoxides, such as butadiene monoxide and 2-methyl butadiene monoxide; and, the allyl ethers, such as diallyl ether or allyl methyl, ethyl, vinyl, propyl, isobutyl, isoamyl or cyclohexyl ether.

The above ethers all contain the

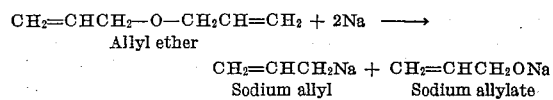

residue directly attached to an ether oxygen. Ethers such as 1,10-dimethoxy-3,7-decadiene and other dialkoxy and monoalkoxy-3,7-decadiene compounds are typical of ethers which rearrange under the conditions under which emulsification is effected to give the above residues and are, therefore, also suitable for the present purpose. Any ether having a straight aliphatic carbon chain of at least four carbon atoms attached to an ether oxygen and containing an ethylenic bond in the gamma position and a hydrogen on the beta carbon, or a similar ether having a chain of at least three carbons containing an ethylenic bond in the alpha position with a hydrogen on the gamma carbon, will rearrange in the presence of the alkali metal to give the required

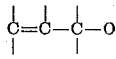

residue and, therefore, be usable, provided it meets the other requirements set forth above.

Substitution derivatives of the above ethers in which the substituent radicals contain only carbon and hydrogen, or carbon, hydrogen and oxygen, are suitable for use provided the presence of the substituent group or groups does not increase the ratio of carbon atoms to cleavable ether groups beyond the limit indicated. All oxygen atoms in the substituent radicals should be present in ether or hydroxy residues.

The exact structure of the complex addition compounds is not definitely known, but indications are that they are complex coordinate compounds similar in type to the coordinate compounds which the recent works of Morton and his co-workers (J. A. C. S. 69, 172, 175, 950 and 1675 (1947)) indicate are formed between sodium phenyl and sodium chloride, methylate or hydroxide; and between certain sodium alkyls and sodium alcoholates. In the articles reporting their work reference is made to the formation of one such complex compound between the cleavage products of diallyl ether:

(a)
$$(CH_2=CHCH_2)_2O + 2Na \longrightarrow$$
$$CH_2=CHCH_2-ONa + CH_2=CHCH_2Na$$

(b)
$$CH_2=CHCH_2-ONa + CH_2=CHCH_2Na \longrightarrow$$

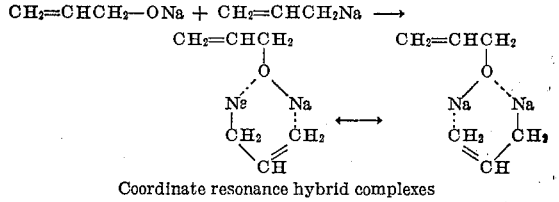

Coordinate resonance hybrid complexes

It is believed that the present emulsifying agents are complex addition compounds of the above general type, stabilized by the release of considerable resonance energy.

The invention is further illustrated by the following examples in which the apparatus described above was employed. The progress of emulsification was followed by preparing microscopic slides and observing them under a microscope equipped with a calibrated micron scale. Because of the high concentration of alkali metal in the mixtures it was necessary to dilute the emulsion to obtain slide specimens thin enough to be observed properly.

*Example 1*

460 g. each of toluene and sodium were introduced into the emulsifying vessel and the temperature of the oil bath was adjusted to and maintained at 106–107° C. After the sodium had melted the pump was operated to effect a preliminary coarse emulsion of the sodium throughout the toluene as the continuous phase. 1,10-dimethoxy-3,7-decadiene, 15 g., was then added in 5 g. increments over a period of 25 minutes while continuing pumping. Sodium particles of about 5 microns in diameter began to appear and after 40 minutes' pumping, the average diameter of the sodium particles was 8 microns. Cooling the charge to room temperature yielded a stable dispersion in which the average diameter of the dispersed particles remained at about 8 microns.

*Example 2*

The general procedure of Example 1 was repeated using a charge of 450 g. each of toluene and sodium maintained at 100–105° C. After operation of the pump for five minutes the sodium particles were about 30–100 microns in diameter. Then 5 g. of beta naphthyl ethyl ether was added with the result that the emulsion assumed a thick, mayonnaise-like consistency. The addition of another 5 g. of the ether and pumping for 30 minutes reduced the diameter of the particles to 1–15 microns, the average being 6. Cooling to room temperature yielded a stable dispersion.

*Example 3*

The general procedure of Example 2 was repeated using alpha naphthyl ethyl ether as the ether added. Upon addition of 5 g. of the ether the average diameter of the sodium particles was 30 microns. Addition of 10 g. more of the ether over a period of 50 minutes reduced the average diameter to 10 microns. This ether tends to produce an emulsion of thick consistency. Addition of a few drops of oleic acid periodically caused sufficient "thinning" to permit effective pumping of the charge. The total acid added was 7 g.

*Example 4*

450 g. of sodium was coarsely emulsified in the same weight of toluene at 102–105° C. as in the previous examples. The addition of 5 g. of phenyl ethyl ether resulted in an immediate reduction of the average diameter of the sodium particles to about 30 microns. After the addition of 15 g. more of the ether over a 45 minute period the average diameter was 15 microns. Total pumping time was 1 hour.

*Example 5*

The above general procedure was repeated using diphenyl ether as the ether added. The first 5 g. of the ether reduced the diameter of the sodium particles from 30–75 to 10–45 microns. Two subsequent 5 g. additions reduced the diameter to an average of 12–15 microns. Pumping was for 1¼ hr. Upon cooling the charge set to thixotropic gel.

*Example 6*

The above general procedure was repeated at 103° C. using 450 g. each of toluene and sodium and 20 g. of methyl benzyl ether. The addition of 15 g. of the ether over a period of 40 minutes reduced the diameter of the sodium particles to 3–20 microns. At this point the charge was too thick to permit effective pumping. Addition of a few drops of oleic acid periodically reduced the charge to a thing fluid consistency permitting easy circulation. In all 5 g. of acid was added. Upon addition of the remaining 5 g. of ether, the diameter of the sodium particles was reduced to 9–12 microns.

*Example 7*

The above general procedure was repeated at 102° C. using 450 g. each of toluene and sodium and 20 g. of dibenzyl ether. The ether was added in 5 g. increments over a period of 55 minutes. 15 minutes after the last addition, the diameter of the sodium particles had been reduced to 1–15 microns and the charge was withdrawn and allowed to cool. Reaction of the ether with the sodium caused a slight reddish brown coloration.

*Example 8*

Example 7 was repeated using butadiene monoxide. The addition of 5 g. of this ether reduced the diameter of the sodium particles to 3–18 microns. 5 g. more of the ether was added at this point. There was a noticeable heat of reaction upon addition of the ether resulting in a thickening of the charge and the formation of a brownish color. A few drops of oleic acid added periodically thinned the charge sufficiently to permit effective pumping. The total acid added was 7 g. The average diameter of the sodium particles upon withdrawal of the charge after pumping for 1 hour was 9–10 microns.

*Example 9*

460 g. each of sodium and a highly refined kerosene were charged to the emulsifying vessel and the oil bath temperature was maintained at about 105° C. After the sodium was melted, 5 g. of 1,10-dimethoxy-3,7-decadiene was added and pumping started. Immediate emulsification of the sodium was apparent and a definite thickening of the mixture resulted. Pumping for 25 minutes at 1275 R. P. M. and a pressure behind the orifice of 67 p. s. i. produced an emulsion in which the diameter of the sodium particles was 5–18 microns, the average being 10 microns. After addition of another 5 g. of the ether the average particle diameter was 6 microns. A final 5 g. of the ether reduced the average diameter to 4 microns, the over-all pumping time being 68 minutes.

*Example 10*

338 g. of a highly refined kerosene and 225 g. potassium were heated in the emulsifying vessel to 70–80° C. to melt the metal. After preliminary emulsification 15 g. of 1,10-dimethoxy-3,7-decadiene was added during 15 minutes. After about 30 minutes, the diameter of the emulsified particles of metal averaged 5 microns.

*Example 11*

338 g. of highly refined kerosene and 291 g. of a sodium-potassium alloy (1:1 weight ratio) were mixed by pumping through the orifice of the emulsifying apparatus as in previous examples at a temperature above the melting point of the alloy. To the resulting coarse emulsion 15 g. of 1,10-dimethoxy-3,7-decadiene was added. After 30 minutes' pumping an emulsion was obtained in which the diameter of the alloy particles averaged 3 microns.

*Example 12*

300 g. of highly refined kerosene was heated in the emulsifying vessel to 190° C. and an equal weight of molten lithium was poured in. The mixture was circulated by means of the pump while 15 g. of 1,10-dimethoxy-3,7-decadiene was added. After 30 minutes, an emulsion was obtained in which the diameter of the lithium particles averaged 10–20 microns.

Example 13

A charge of 450 g. each of sodium and toluene was heated and agitated by pumping at a temperature of 100–104° C. The addition of 6 g. of diallyl ether over a period of 2 hrs. reduced the diameter of the metal particles from 30–100 microns to 3–25, the final average diameter being 12–15 microns.

The accepted index for the ignition quality of diesel fuels is the cetane number. The higher such number, the more readily the fuel ignites on compression. With the ever-increasing use of diesel engines for the generation of power, there is a great demand for hydrocarbon fuels with ignition characteristics that will permit their use in a compression-ignition (i. e., diesel) cycle without excessive time lag in ignition. Modern high-speed engines will not operate smoothly with a slow-igniting fuel. Excessive ignition lag leads to incomplete and inefficient combustion, rough running, and heavy smoke formation. There is a recognized need for effective and economical ignition accelerators that will permit the use as diesel fuels of petroleum distillates not now satisfactory for this use because of their inferior ignition quality.

Alkali metals are effective ignition accelerators for diesel fuels, particularly when the metal is present in finely divided form. But, small amounts, e. g., on the order of 0.1%, of the metal are required to produce a relatively large increase in the cetane number when added to diesel fuels of inferior ignition characteristics. It has been discovered that metal dispersions prepared as illustrated by the above examples and containing the present dispersing agents have high utility as diesel fuel additives because of the stability of the dispersions and the extremely finely divided condition of the dispersed metal. Some improvement in cetane number is generally realized with additions of such dispersions in amounts corresponding to a metal concentration in the fuel of as low as about 0.001%. Metal concentrations exceeding about 0.5% are not recommended since greater amounts generally do not further improve the cetane number. Concentrations within the range 0.01 to 0.2% are preferred since they result in a cetane number rise of the order of 10 or greater.

The effectiveness of the present dispersions as diesel fuel additives is illustrated in the following example.

Example 14

A dispersion of sodium in toluene was prepared in the general manner illustrated by the above examples employing the equivalent of 1% each of 1,10-dimethoxy-3,7-decadiene and oleic acid. A test sample of the dispersion to which octyl alcohol was added evolved hydrogen in an amount corresponding to a sodium content of 46%. The particle size range of the dispersed metal was 5 to 10 microns, the average being 8.

A commercial diesel fuel (a straight-run Venezuelan gas oil) was dried over metallic sodium. There was then added to a portion of the dried fuel an amount of the above sodium dispersion sufficient to give a sodium content in the fuel of 0.05%. This fuel containing the dispersed sodium was found to have a cetane number of 74 whereas the cetane number of the fuel to which no dispersion was added was only 47.

When employing the present dispersions as additives to diesel fuels as illustrated above, the ratio of alkali metal to dispersing agent in the fuel will, of course, be the same as in the dispersion added. The ratio of metal to dispersing agent in the fuel may vary considerably but generally will be within the range of about 650:1 to 1:1 and preferably 130:1 to 2:1. The particle size of the dispersed metal in the fuel should be less than 100 microns and should average not more than 50. Preferably the average particle size will be less than 25 microns.

In the preparation of the present dispersions the emulsifying agent may be added initially to the mixture of metal and inert liquid, but the preferred method involves effecting a preliminary emulsification solely by means of agitation. The emulsifying agent or preferably the ether from which it may be formed in situ is then added and agitation is continued for a short time thereafter until the desired or maximum degree of subdivision is attained. The resulting emulsion may then be cooled to ordinary temperatures, without requiring special precaution in handling during cooling. While fairly fine subdivision, e. g., 50 to 500 microns, may be attained merely by means of adequate agitation, the resulting dispersed particles readily coalesce and no stable system is possible in the absence of an effective emulsifying agent. When emulsifying agents are present, the fine subdivision and general stability of the dispersion are retained upon dilution with inert liquids.

Addition of the emulsifying agent or a compound or compounds from which it is formed to a mixture of molten alkali metal and inert liquid under agitation, particularly when the mixture contains around 30 to 65% of alkali metal by weight, results in final dispersions which are fairly viscous. By the addition thereto of a small amount of a higher fatty acid, or an alkali metal soap thereof, the fluidity of the product is greatly improved. When an acid is added it reacts immediately with the metal to form a soap. Such use of a soap formed in situ by the addition of a higher fatty acid is preferred. Any of the known higher fatty acids, either saturated or unsaturated and having either a straight or a branched chain structure, may be used. Specific examples of such acids are: hexoic, diethyl acetic, heptoic, octoic, nonoic, capric, undecylic, lauric, myristic, palmitic, margaric, stearic, arachidic, cerotic, melissic, oleic and erucic acids. Generally, only small amounts of the acids are required and amounts within the range 0.005 to 0.1% based on the total weight of the dispersion give excellent thinning results. The physical effect here is believed to be that of "protective colloid" action. Larger amounts, e. g., 0.1 to 5%, form thixotropic gels as shown in Hansley U. S. Patent 2,394,608.

The extent of emulsification of the molten metal in the inert liquid will depend somewhat upon the effectiveness of the agitation provided. Assuming that a highly effective means is employed for agitating the mixture, the extent of the emulsification and the particle size of the dispersed metal are dependent upon the amount of emulsifying agent present and the amount of metal to be dispersed since the effect of the emulsifying agent results from its action at the metal surface. Thus, for 50% dispersions, when a given amount of the agent yields dispersions of particle size averaging about 10 microns, approximately 10 times that amount is required to give a dispersion of particle size of 1 micron and approximately 100 times that original amount is required to obtain dispersions of particle size averaging 0.1 micron. For preparing dispersions containing about 20 to 65% by weight of dispersed metal, the practical concentrations of the agent are generally within the range 0.5 to 10% based upon the total weight of the dispersion. Smaller amounts, e. g., as low as 0.1% may be used, particularly if a dispersion having a low metal content is being prepared. Larger amounts, e. g., up to 25% and higher are effective particularly when extremely finely divided particles are required but such larger amounts are not generally desired because they contaminate the product unduly.

The present dispersions may be prepared so as to contain any desired amount of dispersed metal which is practical in their preparation and use. For many uses, metal concentrations of 20 to 65% by weight will be most practical and preferred. Concentrations above about 65% yield dispersions which are not generally sufficiently fluid for handling purposes. Dispersions containing less than about 20% metal may be valuable and desirable for certain purposes. Low concentration dispersions are generally most practically made by diluting more concentrated products with an inert liquid such as benzene, toluene, xylene, white oils, mineral oils, refined diesel fuels and the like. Diluents boiling either above or below the melting point of the metal may be used.

Any temperature between the melting point of the alkali metal and the boiling or decomposition point of the inert organic liquid may be employed in preparing the present products. The preferred temperature is generally within the range of from just above to about 10 to 15° C. above the melting point of the metal. In the case of sodium the preferred range is about 100 to 115° C.

Any organic liquid may be used in preparing the present dispersions so long as it is inert to the alkali metal and has a boiling point above the melting point of the metal under the conditions of use. Examples of such liquids are: xylene, toluene, various petroleum solvents such as kerosene, straight-run gas oil, white oil and the like; and inert ethers such as di-n-butyl ether and methyl oleyl ether. The final dispersions may generally be diluted as desired by the addition of an inert liquid such as toluene, xylene, naphtha, diesel fuels and the like.

Care should be exercised in handling the present dispersions, particularly those having a high metal content. On contact with textile materials such as clothing, the inert liquid is removed by capillary action which leaves a residue of reactive finely divided metal which may ignite spontaneously.

We claim:

1. A composition comprising a dispersion of finely divided alkali metal particles in an inert organic liquid having a boiling point above the melting point of said metal and containing 0.1 to 25% by weight of a complex addition compound resulting from the reaction between (1) an alkali metal alkoxide of the formula MO—R wherein M is an alkali metal and R is from the group consisting of aliphatic, cycloaliphatic and aromatic radicals; and (2) an alkali metal organic compound having at least one residue of the structure

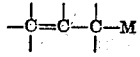

wherein M is an alkali metal, the ratio of the total number of carbon atoms to alkali metal atoms in said addition compound being 2-8:1, all oxygen atoms present in said addition compound being present as part of a residue from the group consisting of

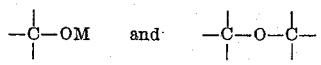

said addition compound containing only carbon, hydrogen, oxygen, and alkali metal.

2. A composition according to claim 1 wherein the inert liquid is a hydrocarbon and the average particle size of the dispersed metal is not more than 50 microns.

3. A composition according to claim 2 containing 20 to 65% by weight of alkali metal and 0.5 to 10% of said complex addition compound.

4. A composition according to claim 2 containing 0.005 to 5% of an alkali metal soap of a higher fatty acid.

5. A composition according to claim 2 wherein said complex addition compound results from the reaction between the alkali metal cleavage products of a conjugated diene hydrocarbon monoxide.

6. A composition according to claim 2 wherein said complex addition compound results from the reaction between the alkali metal cleavage products of an allyl ether.

7. A composition according to claim 2 wherein said complex addition compound results from the reaction between the alkali metal cleavage products of a 1,10-dialkoxy-3,7-decadiene.

8. A composition according to claim 2 wherein the dispersed metal is sodium and the compounds reacted to form said complex addition compound are sodium compounds.

9. A process for the production of a dispersion of an alkali metal in an inert organic liquid having a boiling point above the melting point of said metal, comprising agitating a mixture of said metal, said liquid and 0.1 to 25% by weight of a complex addition compound resulting from the reaction between (1) an alkali metal alkoxide of the formula MO—R wherein M is an alkali metal and R is from the group consisting of aliphatic, cycloaliphatic and aromatic radicals; and (2) an alkali metal organic compound having at least one residue of the structure

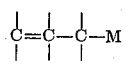

wherein M is an alkali metal, the ratio of the total number of carbon atoms to alkali metal atoms in said addition compound being 2-8:1, all oxygen atoms present in said addition compound being present as part of a residue from the group consisting of

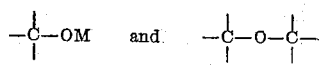

said addition compound containing only carbon, hydrogen, oxygen and alkali metal, at a temperature between the melting point of said metal and the boiling point of said liquid and then cooling the resulting emulsion.

10. A process according to claim 9 wherein the inert liquid is a hydrocarbon and the complex addition compound is formed in situ.

11. A process in accordance with claim 9 wherein 0.5 to 10% of the complex addition compound is used.

12. A process according to claim 9 wherein the concentration of alkali metal in the mixture is 20 to 65% by weight.

13. A process according to claim 9 wherein 0.005 to 5% by weight of a higher fatty acid is added to the mixture.

14. A process according to claim 9 wherein the alkali metal is sodium.

15. A process according to claim 9 wherein the complex addition compound is formed by the addition to the mixture of a conjugated diene hydrocarbon monoxide.

16. A process according to claim 9 wherein the complex addition compound is formed by the addition to the mixture of an allyl ether.

17. A process according to claim 9 wherein the complex addition compound is formed by the addition to the mixture of a 1,10-dialkoxy-3,7-decadiene.

18. A diesel fuel containing an alkali metal and a complex addition compound in the ratio of 650:1 to 1:1, said alkali metal being present in said fuel at a concentration of 0.001 to 0.5% and as dispersed metal particles of particle size less than 100 microns and averaging not more than 50 microns, said complex addition compound resulting from the reaction between (1) an alkali metal alkoxide of the formula MO—R, wherein M is an alkali metal and R is from the group consisting of aliphatic, cycloaliphatic and aromatic radicals and (2) an alkali metal organic compound having at least one residue of the structure

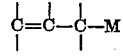

wherein M is an alkali metal the ratio of the total number of carbon atoms to alkali metal atoms in said addition compound being 2–8:1, all oxygen atoms present in said addition compound being present as a part of a residue from the group consisting of

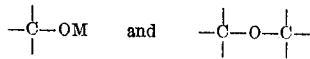

said addition compound containing only carbon, hydrogen, oxygen and alkali metal.

19. A diesel fuel according to claim 18, wherein the concentration of alkali metal is 0.01 to 0.2% and the average particle size of the dispersed particles is less than 25 microns.

20. A diesel fuel according to claim 19 wherein the alkali metal is sodium.

21. A composition according to claim 2 wherein said complex addition compound results from the reaction of the alkali metal cleavage products of an ether.

22. A process according to claim 9 wherein the complex addition compound is formed by the addition to the mixture of an ether.

VIRGIL L. HANSLEY.
WILLARD JOHN P. HILTS.

REFERENCES CITED

The following references are of record in the file of this patent:

UNITED STATES PATENTS

| Number | Name | Date |
|---|---|---|
| 2,394,608 | Hansley | Feb. 12, 1946 |
| 2,409,519 | Tanner | Oct. 15, 1946 |
| 2,483,886 | Crouch | Oct. 4, 1949 |
| 2,483,887 | Crouch | Oct. 4, 1949 |
| 2,487,333 | Hansley | Nov. 8, 1949 |
| 2,487,334 | Hansley | Nov. 8, 1949 |